(12) United States Patent
Raeder et al.

(10) Patent No.: US 11,584,407 B2
(45) Date of Patent: Feb. 21, 2023

(54) POWER MANAGEMENT SYSTEM FOR A CONSIST

(71) Applicant: Progress Rail Locomotive Inc., LaGrange, IL (US)

(72) Inventors: Benjamin Raeder, Bartlett, IL (US); Gregory Kupiec, Lemont, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 754 days.

(21) Appl. No.: 16/548,464

(22) Filed: Aug. 22, 2019

(65) Prior Publication Data
US 2021/0053594 A1 Feb. 25, 2021

(51) Int. Cl.
*B61L 3/00* (2006.01)
*B61C 7/04* (2006.01)

(52) U.S. Cl.
CPC ............... *B61L 3/006* (2013.01); *B61C 7/04* (2013.01)

(58) Field of Classification Search
CPC .. B61L 3/006; B61L 3/008; B61L 3/08; B61L 3/16; B61C 5/00; B61C 7/04; B61C 11/00; B61C 13/00; B61C 17/12
See application file for complete search history.

(56) References Cited

U.S. PATENT DOCUMENTS

2006/0138285 A1* 6/2006 Oleski ................... B61L 25/025
246/167 R

FOREIGN PATENT DOCUMENTS

WO 2010011540 A2 1/2010

* cited by examiner

*Primary Examiner* — Robert J McCarry, Jr.
(74) *Attorney, Agent, or Firm* — Harrity & Harrity LLP (57) ABSTRACT

A first locomotive that includes a control unit is disclosed. The control unit may receive a power demand, determine a first power limit of the first locomotive, and receive a second power limit of a second locomotive and a third power limit of a third locomotive. The control unit may proportion the power demand into a first power allocation for the first locomotive, a second power allocation for the second locomotive, and a third power allocation for the third locomotive. The control unit may adjust the first power allocation based on the first power limit, adjust the second power allocation based on the second power limit, and adjust the third power allocation based on the third power limit. The control unit may cause an action to be performed in connection with the first power allocation, the second power allocation, and the third power allocation.

17 Claims, 5 Drawing Sheets

POWER MANAGEMENT SYSTEM FOR A CONSIST

TECHNICAL FIELD

The present disclosure relates generally to a consist and, for example, to a power management system for a consist.

BACKGROUND

A consist is used for rail transportation and generally includes a sequence of locomotives (e.g., a lead locomotive and one or more trailing locomotives) and one or more railcars coupled to the locomotives. The lead locomotive may include a power source (e.g., a diesel engine, a gasoline engine, a natural gas engine, an electric power source, a hybrid power source, and/or the like) for generating propulsion power to propel the consist along tracks of a railway. Furthermore, the lead locomotive may be equipped with one or more traction motors that can be electronically controlled to drive a set of wheels of the lead locomotive or apply dynamic braking. In some cases, one or more of the trailing locomotives may be provided with individual power sources that generate propulsion power to aid the lead locomotive in propelling the consist. The trailing locomotives may also be equipped with traction motors for driving a respective set of wheels and for applying dynamic braking. Railcars are typically not supplied with individual power sources or traction motors, but rather are pushed or pulled by the locomotives of the consist.

A consist may be operated by a single operator that is typically seated in the lead locomotive. The lead locomotive may include throttle controls enabling the operator to set a travel speed of the consist and/or adjust a power demand of the consist. In some cases, the operator may set a throttle notch position within the lead locomotive corresponding to a desired level of power output, which automatically adjusts the respective throttle notch positions of the trailing locomotives to the same throttle notch position. Accordingly, the locomotives of the consist can be controlled to output consistent levels of power and share a given load from a single point of control. In some cases, however, a locomotive of the consist may experience a deficiency (e.g., associated with the engine, the traction motors, and/or the like) that renders the locomotive suboptimal and incapable of outputting as much power as other locomotives in the consist. Using current throttle controls, an operator may be unable to sufficiently address and/or compensate for the deficiency.

In some cases, such as if a deficiency occurs during travel and if the deficiency occurs in a trailing locomotive that is remote from an operator, the operator may be unaware of the deficiency and proceed to demand power according to normal travel speeds. Being unaware of the deficiency, the operator may even increase the power demand upon noticing that the actual travel speed is slower than the desired travel speed. In some cases, even if the operator becomes aware of the deficiency, current throttle controls may not enable the operator to individually adjust the throttle notch position of the deficient locomotive or reduce a power demand of the deficient locomotive without slowing the travel speed of the entire consist. Such continued operation of the deficient locomotive may cause adverse effects. For instance, operating a deficient engine and/or a deficient traction motor according to power demands which exceed capabilities of the engine and/or the traction motor for prolonged periods of time may accelerate wear of the engine and/or the traction motor, cause the engine and/or the traction motor to overheat, cause damage to surrounding components, and/or the like.

One attempt to provide individual throttle controls for locomotives of a consist is disclosed in U.S. Publication No. 2006/0138285 by Oleski, et al. filed on Jan. 6, 2006 ("the '285 publication"). In particular, the '285 publication discloses a consist manager that receives a control command and determines a first power operating mode of a first locomotive and a second power operating mode of a second locomotive. The '285 publication discloses that the consist manager determines if a trail locomotive in the consist has been operating at a relatively high throttle notch setting for a particular period of time, and if a second trail locomotive in the consist has been operating at a relatively low throttle setting for the same period of time. If so, the '285 publication discloses that the consist manager balances fuel by switching the notch settings of each of the first and second trail locomotives. While the '285 publication may enable individual switching of notch settings, the '285 publication lacks an ability to adjust power demands for individual locomotives to safeguard a deficient locomotive of a consist or to compensate for a deficient locomotive of a consist.

A power management system of the present disclosure solves one or more of the problems set forth above and/or other problems in the art.

SUMMARY

According to some implementations, a method may include receiving, by a device, power demand data relating to a power demand of a consist, the consist including at least a first locomotive and a second locomotive; receiving, by the device, power limit data relating to at least a first power limit of the first locomotive and a second power limit of the second locomotive; proportioning, by the device, the power demand into at least a first power allocation for the first locomotive and a second power allocation for the second locomotive, the first power allocation and the second power allocation being configured to collectively approximate at least a portion of the power demand; adjusting, by the device and based on the power demand and the first power limit, the first power allocation; adjusting, by the device and based on the power demand and the second power limit, the second power allocation; causing, by the device, the first locomotive to be operated according to the first power allocation; and causing, by the device, the second locomotive to be operated according to the second power allocation.

According to some implementations, a device may include one or more memories, and one or more processors communicatively coupled to the one or more memories. The one or more processors may be configured to receive power demand data relating to a power demand of a consist, the consist including a plurality of locomotives; receive power limit data relating to respective power limits of the plurality of locomotives; proportion the power demand into respective power allocations for the plurality of locomotives, the respective power allocations being configured to collectively approximate the power demand; adjust, based on the power demand and the respective power limits, one or more of the respective power allocations; and cause an action to be performed in connection with the respective power allocations.

According to some implementations, a first locomotive of a consist may include a frame, a traction motor coupled to the frame, an engine operatively coupled to the traction motor, and a control unit in communication with the traction motor and the engine. The control unit may be configured to receive a power demand of the consist, determine a first power limit of the first locomotive, receive a second power limit of a second locomotive of the consist and a third power limit of a third locomotive of the consist, proportion the power demand into a first power allocation for the first locomotive, a second power allocation for the second locomotive, and a third power allocation for the third locomotive, adjust the first power allocation based on the power demand and the first power limit, adjust the second power allocation based on the power demand and the second power limit, adjust the third power allocation based on the power demand and the third power limit, and cause an action to be performed in connection with the first power allocation, the second power allocation, and the third power allocation.

DETAILED DESCRIPTION

Figure 1:
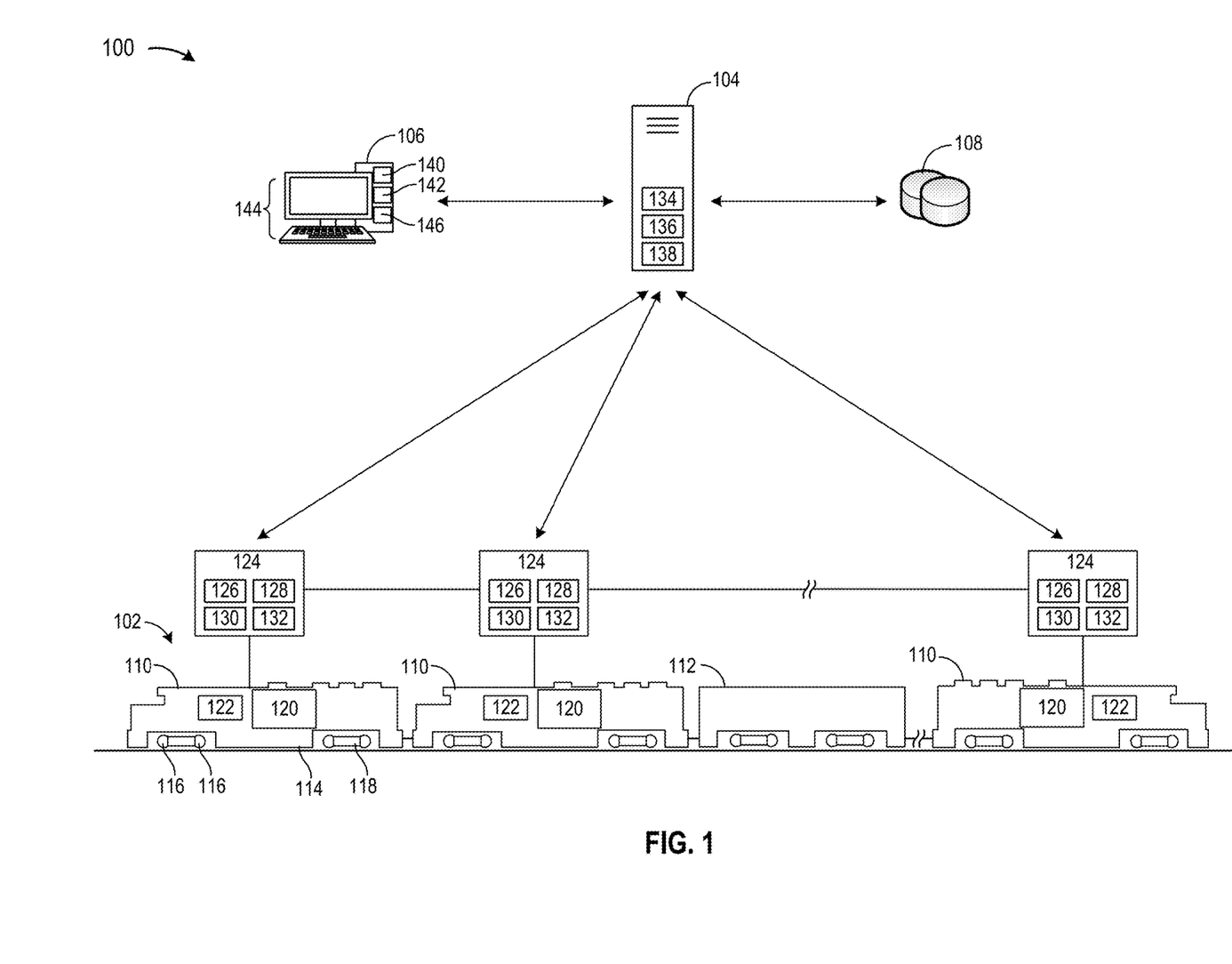
FIG. 1 is a diagram of an example power management system described herein.

FIG. 1 is a diagram of an example power management system 100 described herein. As shown in FIG. 1, power management system 100 may include a consist 102, a consist management platform 104, a control station 106, a network storage device 108, and/or another device configured to facilitate operation of consist 102. Consist 102 may include a locomotive 110 that is coupled to one or more railcars 112 and configured to transport (e.g., push or pull) railcars 112 along tracks of a railway. In some examples, consist 102 may include a plurality of locomotives 110 (e.g., one lead locomotive 110 and one or more trailing locomotives 110) that collectively generate power sufficient to transport the consist 102 and interconnected railcars 112. Power management system 100 may be used to determine a power demand and/or another operating parameter of consist 102, monitor an operating condition of locomotives 110 of consist 102, manage power distribution between locomotives 110 of consist 102, provide control signals for controlling power output by individual locomotives 110 of consist 102, and/or provide other information for facilitating operation of consist 102.

In some implementations, power management system 100 may include multiple consists 102 and/or multiple control stations 106 that interact with consist management platform 104 and/or network storage device 108. In some examples, power management system 100 may include multiple consist management platforms 104 and/or multiple network storage devices 108 that interact with one or more consists 102 and/or one or more control stations 106. In some examples, power management system 100 may be used with an autonomously or a semi-autonomously operated consist 102. For example, power management system 100 may be used to guide, navigate, and/or control an autonomous or a semi-autonomous consist 102 based on location data of consist 102, coordinate data associated with a railway, coordinate data associated with a target route and/or destination, target travel speed data, and/or the like. In some examples, consist 102 may receive guidance, navigation, and/or control information from a remote operator via control station 106, from an operator local to consist 102, and/or from another device of power management system 100.

As further shown in FIG. 1, locomotive 110 includes a frame 114, traction elements 116, a traction motor 118, an engine 120, a set of sensors 122, and a control unit 124. Traction elements 116 may include wheels that are movably coupled to frame 114, configured to engage tracks of the railway, and caused to be driven by traction motors 118 and/or engine 120. Traction motor 118 may include an electric motor that is powered by engine 120 and configured to operate in a driving mode to propel locomotive 110 or in a dynamic braking mode to slow locomotive 110. In some examples, traction motor 118 may operate in a regenerative braking mode to generate electrical energy via movement of traction elements 116. Engine 120 may include a diesel engine, a gasoline engine, a natural gas engine, and/or the like configured to generate power for propelling locomotive 110. In some examples, engine 120 may substituted or used in conjunction with an electric power source, a hybrid power source, and/or the like. Sensors 122 may include a temperature sensor, a pressure sensor, a flow rate sensor, a speed sensor, a proximity sensor, and/or another sensing device that is associated with traction elements 116, traction motor 118, engine 120, and/or control unit 124 and configured to provide engine data, traction motor data, and/or health data associated with locomotive 110.

Control unit 124 includes a processor 126, a memory 128, a user interface 130, and a communication device 132. Processor 126 is implemented in hardware, firmware, and/or a combination of hardware and software capable of being programmed to perform a function associated with locomotive 110. Memory 128 includes a random-access memory (RAM), a read only memory (ROM), and/or another type of dynamic or static storage device that stores information and/or instructions to be performed by processor 126. User interface 130 includes an input device enabling an operator of locomotive 110 to specify a propulsion request, a braking request, a power demand, a target travel speed, and/or another parameter for operating one or more locomotives 110 of consist 102, and an output device enabling the operator to view or otherwise access an actual travel speed, a power output, engine data, traction motor data, health data and/or another operating condition of one or more locomotives 110 of consist 102. In some examples, user interface 130 may include a throttle input device (e.g., a physical and/or visual representation of a lever, a dial, a button, and/or the like) that enables the operator to adjust an operating parameter of one or more locomotives 110.

Communication device 132 includes a local area network (LAN) component (e.g., an Ethernet and/or another communication bus component), a wireless local area network (WLAN) component (e.g., a Wi-Fi component), a radio frequency (RF) communication component (e.g., a Bluetooth component), and/or the like. Communication device 132 may enable communication between locomotives 110 of consist 102, consist management platform 104, control station 106, network storage device 108, and/or another device. Communication device 132 may enable processor 126 to receive an operating parameter that can be used for operating one or more locomotives 110 of consist 102 from consist management platform 104, control station 106, network storage device 108, and/or another locomotive 110. Communication device 132 may enable processor 126 to transmit an operating parameter to another locomotive 110 and/or transmit an operating condition of one or more locomotives 110 to consist management platform 104, control station 106, network storage device 108, and/or another locomotive 110.

In some implementations, control unit 124 may receive power demand data relating to a power demand of consist 102, receive power limit data relating to respective power limits of locomotives 110 of consist 102, proportion the power demand into respective power allocations for locomotives 110, adjust one or more of the power allocations based on the power demand and the respective power limits, and cause an action to be performed in connection with the respective power allocations. For example, control unit 124 may generate one or more control signals for operating one or more locomotives 110 (e.g., control signals for operating traction motor 118 and/or engine 120 of locomotives 110) according to the respective power allocations and transmit the control signals to corresponding locomotives 110. The power limit data may correspond to power output capabilities and/or limitations of locomotives 110 and include information relating to engine data, traction motor data, and/or health data. The power allocations may be adjusted to be within the respective power limits of locomotives 110 while collectively approximating the power demand or at least a portion of the power demand.

In some implementations, control unit 124 may receive the power limit data in a form of engine data, traction motor data, and/or health data, and determine the power limits based on the engine data, the traction motor data, and/or the health data. In some examples, control unit 124 may receive the power limit data in a form of power limits determined by another device (e.g., consist management platform 104, control station 106, and/or network storage device 108). In some examples, such as when one or more locomotives 110 of consist 102 are operating with a deficiency, a malfunction, or otherwise unable to generate power output sufficient to satisfy a power demand requested by an operator, control unit 124 may determine a derated power demand based on the power demand, and proportion power allocations based on the derated power demand. In some examples, control unit 124 may detect a change in the power demand and/or the power limits of locomotives 110 (e.g., intermittently, periodically, and/or continuously in real time) and adjust the power allocations based on the change. One or more functions described as being performed by control unit 124 may be performed by consist management platform 104, control station 106, and/or network storage device 108.

As further shown in FIG. 1, consist management platform 104 includes a processor 134, a memory 136, and a communication device 138. Processor 134 is implemented in hardware, firmware, and/or a combination of hardware and software capable of being programmed to perform a function associated with operating one or more locomotives 110 of consist 102. Memory 136 includes a RAM, a ROM, and/or another type of dynamic or static storage device that stores information and/or instructions to be performed by processor 134. Communication device 138 includes a WLAN component (e.g., a Wi-Fi component), an RF communication component (e.g., a Bluetooth component), and/or the like. Communication device 138 may enable processor 134 to receive an operating parameter that can be used for operating one or more locomotives 110 of consist 102 from control station 106, network storage device 108, and/or one or more locomotives 110, and/or receive an operating condition from one or more locomotives 110. Communication device 138 may enable processor 134 to transmit an operating parameter to one or more locomotives 110 of consist 102 and/or transmit an operating condition of one or more locomotives 110 to control station 106, network storage device 108, and/or one or more locomotives 110.

In some implementations, consist management platform 104 may receive power demand data relating to a power demand of consist 102, receive power limit data relating to respective power limits of locomotives 110 of consist 102, proportion the power demand into respective power allocations for locomotives 110, adjust one or more of the power allocations based on the power demand and the respective power limits, and cause an action to be performed in connection with the respective power allocations. For example, consist management platform 104 may generate one or more control signals for operating one or more locomotives 110 according to the respective power allocations and transmit the control signals to corresponding locomotives 110 of consist 102. In some examples, consist management platform 104 may determine a derated power demand based on the power demand, and proportion power allocations based on the derated power demand. In some examples, consist management platform 104 may detect a change in the power demand and/or the power limits of locomotives 110 (e.g., intermittently, periodically, and/or continuously in real time) and adjust the power allocations based on the change.

As further shown in FIG. 1, control station 106 includes a processor 140, a memory 142, a user interface 144, and a communication device 146. Processor 140 is implemented in hardware, firmware, and/or a combination of hardware and software capable of being programmed to perform a function associated with a consist. Memory 142 includes a RAM, a ROM, and/or another type of dynamic or static storage device that stores information and/or instructions to be performed by processor 140. User interface 144 includes an input device enabling an operator (e.g., an operator that is remote to consist 102) to specify a propulsion request, a braking request, a power demand, a target travel speed, and/or another parameter for operating one or more locomotives 110 of consist 102, and an output device enabling the operator to view or otherwise access an actual travel speed, a power output, engine data, traction motor data, health data and/or another operating condition of one or more locomotives 110 of consist 102. In some examples, user interface 144 may include a throttle input device (e.g., provided within a virtual environment and/or the like) that enables the operator to adjust an operating parameter of one or more locomotives 110.

Communication device 146 includes a WLAN component (e.g., a Wi-Fi component), an RF communication component (e.g., a Bluetooth component), and/or the like. Communication device 146 may enable processor 140 to receive an operating parameter that can be used for operating one or more locomotives 110 of consist 102 from consist management platform 104, network storage device 108, and/or one or more locomotives 110, and/or receive an operating condition from one or more locomotives 110. Communication device 146 may enable processor 140 to transmit an operating parameter to one or more locomotives 110 of consist 102 and/or transmit an operating condition of one or more locomotives 110 to consist management platform 104, network storage device 108, and/or one or more locomotives 110 of consist 102. In some examples, control station 106 may communicate with one or more locomotives 110 and/or network storage device 108 directly and/or indirectly via consist management platform 104. Additionally, or alternatively, control station 106 may serve as a user interface of consist management platform 104.

In some implementations, control station 106 may receive power demand data relating to a power demand of consist 102, receive power limit data relating to respective power limits of locomotives 110 of consist 102, proportion the power demand into respective power allocations for locomotives 110, adjust one or more of the power allocations based on the power demand and the respective power limits, and cause an action to be performed in connection with the respective power allocations. For example, control station 106 may generate one or more control signals for operating one or more locomotives 110 according to the respective power allocations, and transmit the control signals to corresponding locomotives 110 of consist 102. In some examples, consist management platform 104 may determine a derated power demand based on the power demand, and proportion power allocations based on the derated power demand. In some examples, consist management platform 104 may detect a change in the power demand and/or the power limits of locomotives 110 (e.g., intermittently, periodically, and/or continuously in real time) and adjust the power allocations based on the change.

As further shown in FIG. 1, network storage device 108 includes one or more devices capable of storing, processing, and/or routing information. Network storage device 108 may include, for example, a server device, a device that stores a data structure, a device in a cloud computing environment or a data center, and/or the like. In some examples, network storage device 108 may include a communication interface that allows network storage device 108 to receive information from and/or transmit information to consist management platform 104, control station 106, and/or control unit 124 of one or more locomotives 110 of consist 102. In some examples, network storage device 108 may store location data of consist 102, location data of another consist 102, coordinate data associated with a railway, coordinate data associated with a target route and/or destination, target travel speed data, and/or other information that can be used to guide, navigate, and/or control consist 102. In some examples, network storage device 108 may maintain other data relating to consist 102 (e.g., information relating to an event log of consist 102, a specification of consist 102, a diagnostic record of consist 102, an operator of consist 102, and/or the like).

As indicated above, FIG. 1 is provided as an example. Other examples may differ from what was described in connection with FIG. 1.

Figure 2A:
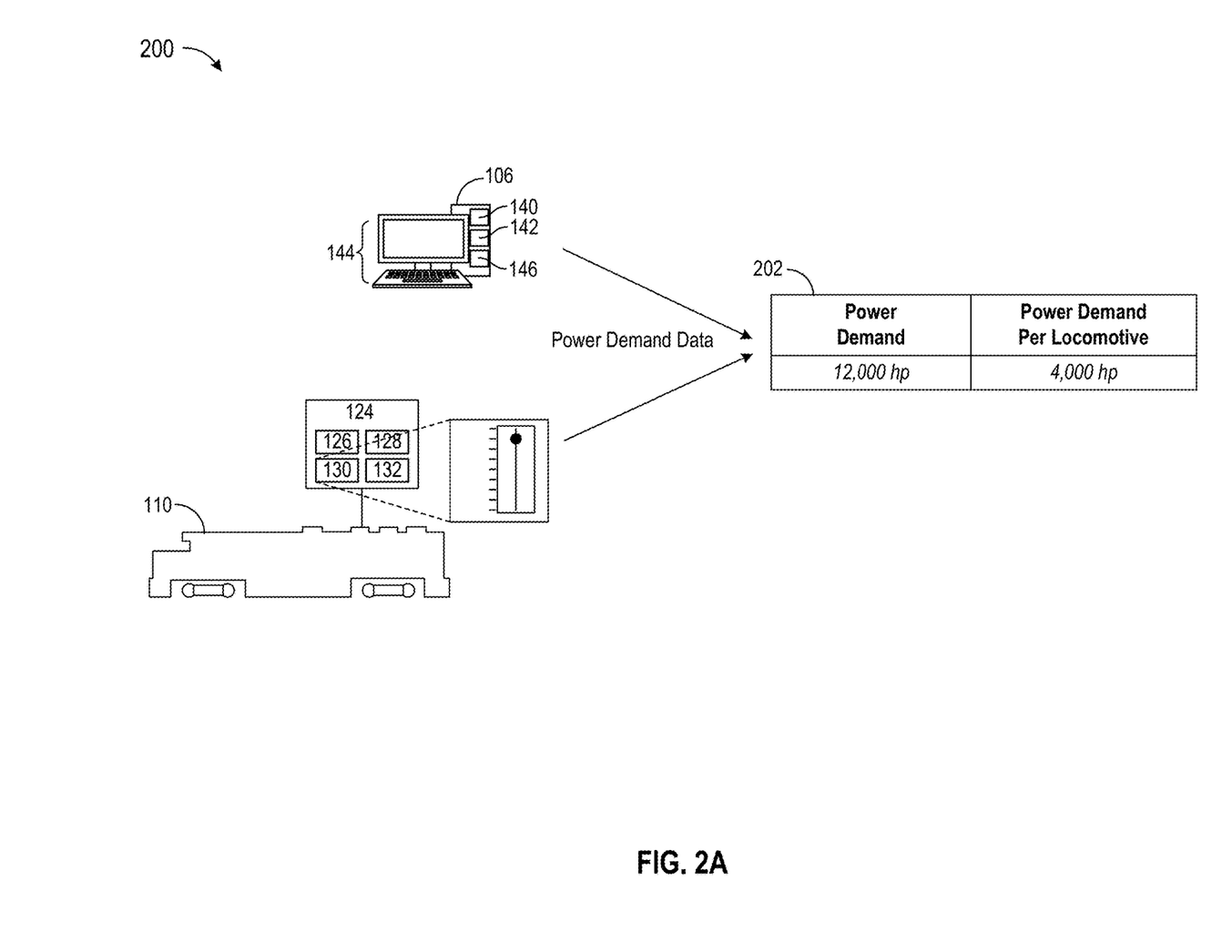
FIGS. 2A-2C are diagrams of an example implementation of a power management system described herein.
Figure 2B:
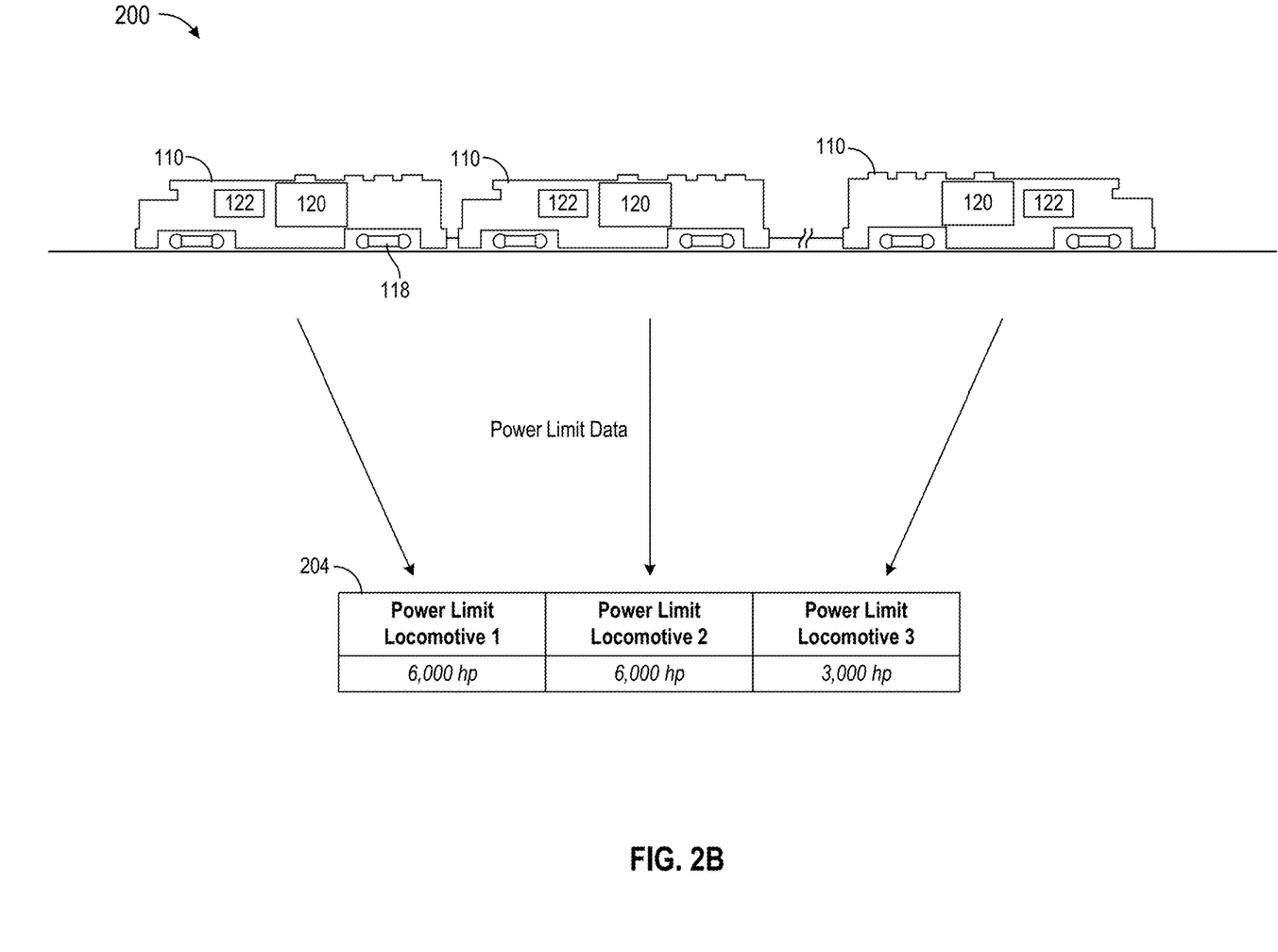
Figure 2C:
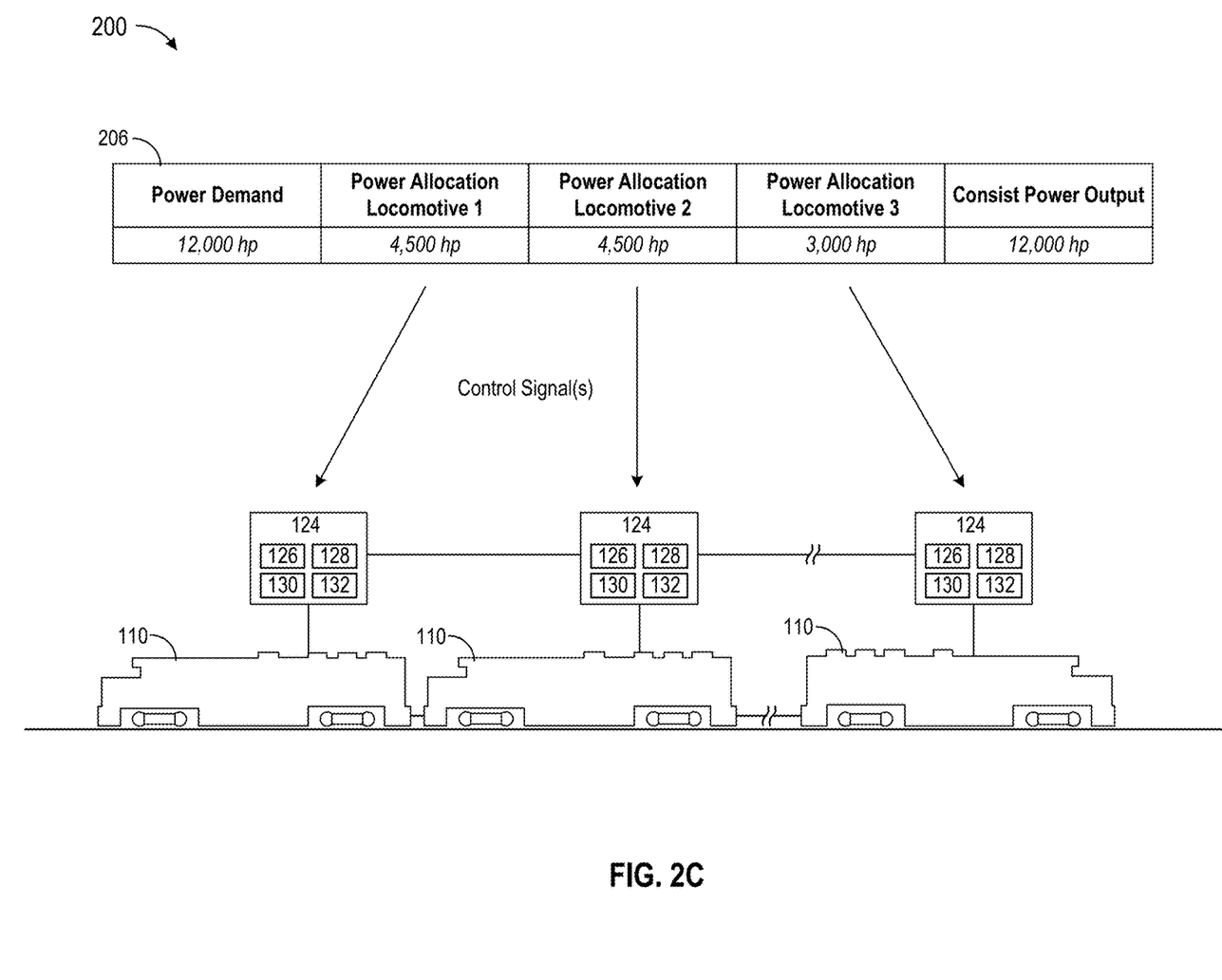

FIGS. 2A-2C are diagrams of an example implementation 200 of power management system 100 described herein. As shown in FIG. 2A, and by reference number 202, control unit 124, consist management platform 104, and/or control station 106 may receive power demand data from an operator of consist 102. For example, control unit 124 may receive power demand data corresponding to a power demand specified by an operator onboard consist 102 via user interface 130 (e.g., a physical and/or a visual representation of a throttle input device). Additionally, or alternatively, control station 106 may receive power demand data corresponding to a power demand specified by an operator that is remote to consist 102 via user interface 144 (e.g., a virtualized throttle input device). In some examples, consist management platform 104 may receive the power demand data via control unit 124 and/or control station 106. In some examples, such as when one or more locomotives 110 of consist 102 are autonomously or semi-autonomously operated (e.g., by consist management platform 104 and/or the like), the power demand may be determined and/or specified by consist management platform 104. In such cases, control unit 124 and/or control station 106 may receive the power demand data from consist management platform 104.

In some implementations, control unit 124, consist management platform 104, and/or control station 106 may receive the power demand data as an aggregate power demand value that corresponds to a collective power output requested from locomotives 110 of consist 102. In some examples, the power demand data may be received as a target travel speed, as part of a propulsion request, and/or as part of a braking request corresponding to the power demand. In some examples, the power demand data may be received as individual power demand values that correspond to individual power outputs requested from individual locomotives 110. As shown for the example in FIG. 2A, the power demand may initially be proportioned into respective power allocations for locomotives 110 of consist 102. In some examples, such as when individual locomotives 110 have similar power ratings, the power demand (e.g., 12,000 hp) may be proportioned such that the respective power allocations (e.g., 4,000 hp for each of three locomotives 110) are substantially equal in value and such that the respective power allocations collectively approximate the power demand or at least a portion of the power demand. The power demand may be proportioned differently for a different number of locomotives 110 and/or for locomotives 110 having different power ratings.

As shown in FIG. 2B, and by reference number 204, control unit 124, consist management platform 104, and/or control station 106 may receive power limit data relating to respective power limits of locomotives 110 of consist 102. The power limit of a locomotive 110 may correspond to a power output capability (e.g., a maximum power output) of locomotive 110 that may be limited due to one or more deficiencies that may be identified in association with traction motors 118, engine 120, and/or another component of locomotive 110. For example, the power limit data may include engine data, traction motor data, health data, and/or other information that may be provided by respective sensors 122 of locomotives 110 and used to identify a deficiency and/or another factor for limiting a power output of one or more locomotives 110 of consist 102. In some examples, the power limit data may include information relating to an oil temperature, a coolant temperature, an air temperature, an oil pressure, an air flow rate, a fan speed, a wheel speed, a traction motor speed, and/or another operating condition of locomotive 110.

In some implementations, control unit 124, consist management platform 104, and/or control station 106 may determine respective power limit values of locomotives 110 based on the power limit data. As shown for the example in FIG. 2B, the power limit data may indicate that first and second locomotives 110 (e.g., Locomotive 1 and Locomotive 2) are operating optimally and without a deficiency. Accordingly, control unit 124, consist management platform 104, and/or control station 106 may set the respective power limits of first and second locomotives 110 to respective default values (e.g., maximum power output ratings) for first and second locomotives 110 (e.g., 6,000 hp). In the example shown in FIG. 2B, the power limit data may indicate that a third locomotive 110 (e.g., Locomotive 3) is operating suboptimally (e.g., due to a deficiency associated with traction motors 118, engine 120, and/or the like). Accordingly, control unit 124, consist management platform 104, and/or control station 106 may set the power limit of third locomotive 110 to less than a default value (e.g., less than a maximum power output rating) for third locomotive 110 (e.g., decreased from 6,000 hp to 3,000 hp).

In some implementations, the power limit may be incrementally adjusted (e.g., decreased) by a fixed value (e.g., 3,000 hp), a fixed percentage (e.g., 50%), and/or the like independent of a type of the deficiency identified by the power limit data. In some examples, the power limit may be dynamically adjusted (e.g., decreased in variable increments) based on a particular type of the deficiency identified by the power limit data. In such cases, the power limit may be adjusted by an amount determined based on a control map, a specification, and/or another reference for controlling traction motors 118, engine 120, and/or another component of locomotives 110 that may be stored in network storage device 108 or otherwise accessible to control unit 124, consist management platform 104, and/or control station 106. In some examples, a prior adjustment to the power limit may be removed (e.g., reset to a default value or otherwise increased) if the power limit data no longer indicates a deficiency. In some examples, the power limit data may include respective power limit values of locomotives 110 determined by another device of power management system 100 (e.g., control units 124 of locomotives 110, consist management platform 104, and/or control station 106).

As shown in FIG. 2C, and by reference number 206, control unit 124, consist management platform 104, and/or control station 106 may adjust respective power allocations for locomotives 110 based on the power demand and the respective power limits. For example, control unit 124, consist management platform 104, and/or control station 106 may compare a power allocation for a locomotive 110 with a corresponding power limit and determine whether the power allocation exceeds the power limit. If the power allocation exceeds the power limit, the control unit 124, consist management platform 104, and/or control station 106 may decrease the power allocation for the locomotive 110 by a deration amount. The deration amount may approximate an overage of the power allocation relative to the power limit and/or another amount sufficient to maintain the power allocation at or below the power limit of locomotive 110. As shown for the example in FIG. 2C, the power allocation for third locomotive 110 (e.g., Locomotive 3) may be adjusted (e.g., decreased from 4,000 hp to 3,000 hp) due to the deficiency indicated by the power limit data and the corresponding reduction to the power limit.

As further shown in FIG. 2C, if power allocations for one or more locomotives 110 are reduced, control unit 124, consist management platform 104, and/or control station 106 may increase respective power allocations for other locomotives 110 of consist 102 to compensate for the reduced power output. For example, control unit 124, consist management platform 104, and/or control station 106 may compare the respective power allocations for locomotives 110 with corresponding power limits and determine whether the power allocations can be increased without exceeding the corresponding power limits. If the power allocations can be increased without exceeding the corresponding power limits, control unit 124, consist management platform 104, and/or control station 106 may increase the power allocations according to a compensation amount. The compensation amount may approximate a shortage between an aggregate power output of locomotives 110 and the power demand. As shown for the example in FIG. 2C, the respective power allocations for first and second locomotives 110 (e.g., Locomotive 1 and Locomotive 2) may be adjusted (e.g., increased from 4,000 hp to 4,500 hp) in order to compensate for the reduced power output of third locomotive 110 (e.g., Locomotive 3).

In some implementations, control unit 124, consist management platform 104, and/or control station 106 may determine a power limit ratio based on the power limits of locomotives 110 of consist 102, and proportion the power demand between the power allocations for locomotives 110 based on the power limit ratio. Based on the example shown in FIGS. 2A-2C, a power limit ratio between the respective power limits of locomotives 110 of consist 102 (e.g., 6,000 hp for Locomotive 1, 6,000 hp for Locomotive 2, and 3,000 hp for Locomotive 3) may be 2:2:1. Control unit 124, consist management platform 104, and/or control station 106 may proportion the power demand (e.g., 12,000 hp) into respective power allocations for locomotives 110 according to the power limit ratio (e.g., 4,800 hp allocated for Locomotive 1, 4,800 hp allocated for Locomotive 2, and 2,400 hp allocated for Locomotive 3). Accordingly, the power demand may be proportioned between locomotives 110 in a manner that satisfies the power demand (e.g., 12,000 hp), while maintaining operation of a deficient locomotive 110 at or below a respective power limit (e.g., 3,000 hp).

In some implementations, control unit 124, consist management platform 104, and/or control station 106 may determine respective power allocations based on a derated power demand. For example, based on determining that one of locomotives 110 of consist 102 is operating with a reduced power limit (e.g., due to a deficiency indicated by power limit data), control unit 124, consist management platform 104, and/or control station 106 may decrease an initial power demand requested by an operator by a deration amount and proportion the respective power allocations based on the derated power demand. In some examples, the deration amount may be a fixed value, a fixed percentage, and/or the like that is independent of a type of the deficiency identified by the power limit data. In some examples, the power limit may be dynamically adjusted based on a particular type of deficiency identified by the power limit data. For example, the deration amount may be configured to provide a derated power demand that can be proportioned into derated power allocations that do not exceed respective power limits of locomotives 110 while substantially satisfying the initial power demand.

As further shown in FIG. 2C, control unit 124, consist management platform 104, and/or control station 106 may cause an action to be performed in connection with respective power allocations. In some examples, control unit 124, consist management platform 104, and/or control station 106 may cause locomotives 110 of consist 102 to be operated according to the respective power allocations. For example, control unit 124, consist management platform 104, and/or control station 106 may generate control signals for operating locomotives 110 (e.g., control signals for operating traction motors 118, engine 120, and/or the like) according to the respective power allocations, and transmit the control signals to respective control units 124 of locomotives 110. In some examples, control unit 124, consist management platform 104, and/or control station 106 may continue monitoring for a change in power demand, power limit data, respective power limits, and/or another operating condition of locomotives 110 (e.g., intermittently, periodically, and/or continuously in real time) and adjust one or more of the respective power allocations based on a detected change in the operating condition.

As indicated above, FIGS. 2A-2C are provided as an example. Other examples may differ from what is described in connection with FIGS. 2A-2C.

Figure 3:
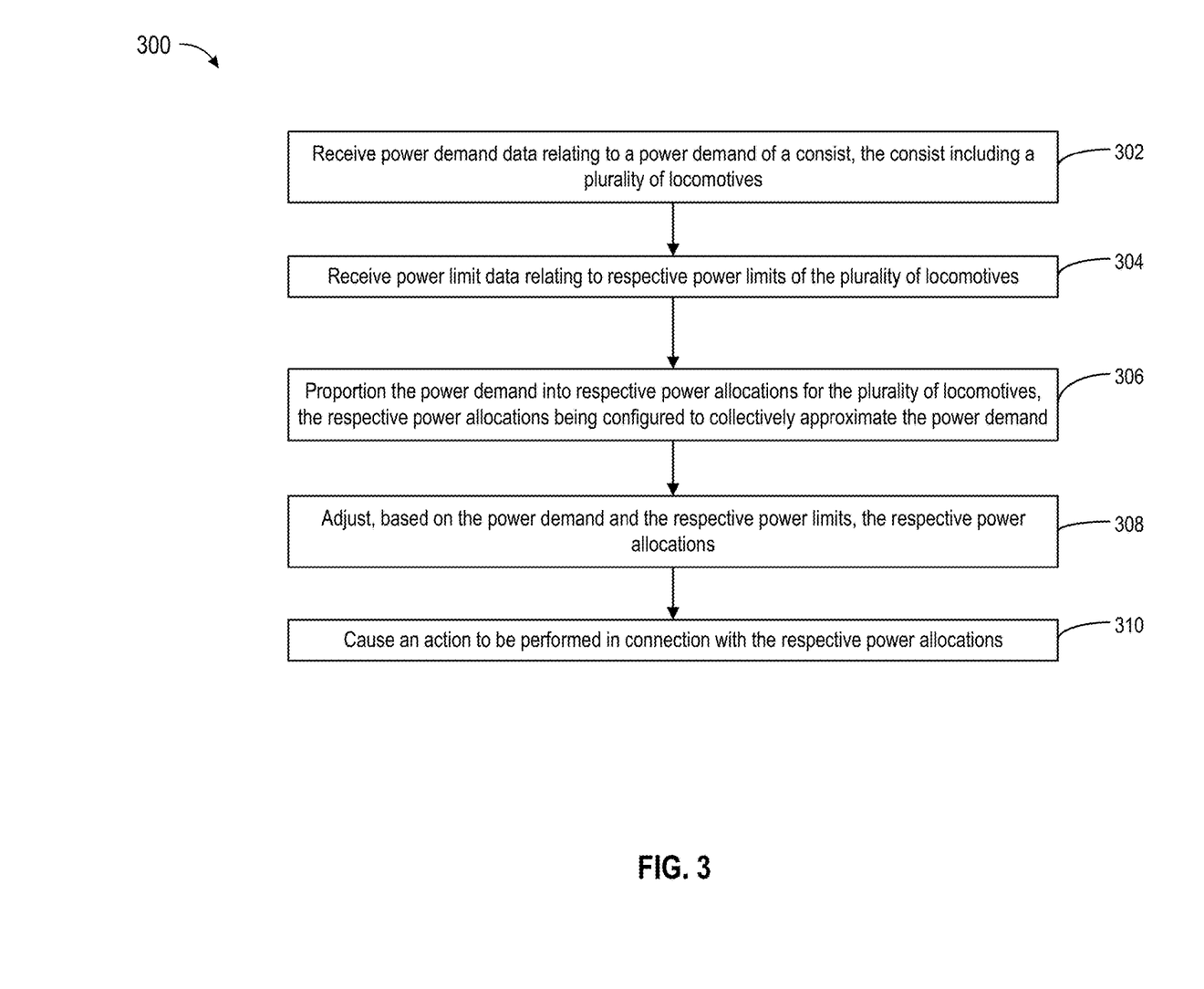
FIG. 3 is a flow chart of an example process for managing power of a consist.

FIG. 3 is a flow chart of an example process 300 for managing power of a consist. One or more process blocks of FIG. 3 may be performed by a control unit of a locomotive (e.g., control unit 124 of power management system 100) and/or by another component or a group of components separate from or including the control unit (e.g., consist management platform 104, control station 106, network storage device 108 and/or the like).

As shown in FIG. 3, process 300 may include receiving power demand data relating to a power demand of a consist, the consist including a plurality of locomotives (block 302). For example, the control unit (e.g., using processor 126, memory 128, user interface 130, communication device 132, and/or the like) may receive power demand data relating to a power demand of a consist, as described above. In some examples, the consist may include a plurality of locomotives.

As further shown in FIG. 3, process 300 may include receiving power limit data relating to respective power limits of the plurality of locomotives (block 304). For example, the control unit (e.g., using processor 126, memory 128, user interface 130, communication device 132, and/or the like) may receive power limit data relating to respective power limits of the plurality of locomotives, as described above.

As further shown in FIG. 3, process 300 may include proportioning the power demand into respective power allocations for the plurality of locomotives, the respective power allocations being configured to collectively approximate the power demand (block 306). For example, the control unit (e.g., using processor 126, memory 128, user interface 130, communication device 132, and/or the like) may proportion the power demand into respective power allocations for the plurality of locomotives, as described above. In some examples, the respective power allocations may be configured to collectively approximate the power demand.

As further shown in FIG. 3, process 300 may include adjusting, based on the power demand and the respective power limits, the respective power allocations (block 308). For example, the control unit (e.g., using processor 126, memory 128, user interface 130, communication device 132, and/or the like) may adjust, based on the power demand and the respective power limits, the respective power allocations, as described above.

As further shown in FIG. 3, process 300 may include causing an action to be performed in connection with the respective power allocations (block 310). For example, the control unit (e.g., using processor 126, memory 128, user interface 130, communication device 132, and/or the like) may cause an action to be performed in connection with the respective power allocations, as described above.

Process 300 may include variations and/or additional implementations to those described in connection with FIG. 3, such as any single implementation or any combination of implementations described elsewhere herein. Although FIG. 3 shows example blocks of process 300, in some examples, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

A consist may be powered by multiple locomotives, such as a lead locomotive and one or more trailing locomotives. A travel speed of the consist may be set by adjusting a power demand that is distributed between the locomotives. The travel speed and/or the power demand is typically set by an operator manning the lead locomotive from a single control point (e.g., a throttle notch position of a throttle input device) located within the lead locomotive. As trailing locomotives are typically unmanned, a throttle setting that is input via the lead locomotive may be configured to automatically adjust the throttle setting in the trailing locomotives to the same setting. Such conventional control systems may rely on an assumption that all of the locomotives of the consist have similar power ratings and/or are operating at optimal levels. However, in some cases, one or more of the locomotives may have a deficiency that can introduce complications that conventional control systems may not be prepared to address. More particularly, an operator using current throttle controls may be unable to reduce a power output of the deficient locomotive without slowing the consist and/or to control other locomotives to compensate for the deficient locomotive.

A power management system described herein enables more precise power management between locomotives of a consist, and can monitor operating conditions of individual locomotives and adjust individual power output levels of the locomotives to address changes in operating conditions. For example, a power management system of the present disclosure may use engine data, traction motor data, health data, and/or other data relating to an operating condition of one or more locomotives of a consist to monitor respective power limits of the locomotives. The power management system may proportion a power demand of the consist into respective power allocations for the locomotives based on the respective power limits of the locomotives. For example, the power management system may decrease the power allocation for a deficient locomotive having a lower power limit, and/or increase the power allocation for a locomotive having a higher power limit to compensate for the deficient locomotive. The power management system may generate individual control signals according to the respective power allocations, and cause the locomotives to be controlled according to the individual control signals.

Accordingly, the power management system may improve power management of a consist and facilitate control of individual locomotives of a consist. For instance, the power management system monitors operating conditions of individual locomotives to promptly identify a deficient or malfunctioning locomotive. The power management system also provides individual throttle control of locomotives to allow a deficient locomotive to be controlled at a lower throttle setting, while controlling other locomotives of the consist at higher throttle settings to compensate for the deficient locomotive. By using other locomotives to compensate for the deficient locomotive, the power management system may enable the consist to maintain target travel speeds despite the deficient or malfunctioning locomotive. By reducing the throttle setting of the deficient or malfunctioning locomotive, the power management system may help reduce further wear or damage of the deficient locomotive, prolong operation of the deficient locomotive, and/or help the consist safely complete a trip in progress.

What is claimed is:

1. A method, comprising:
    receiving, by a device, power demand data relating to a power demand of a consist,
        the consist including at least a first locomotive and a second locomotive;
    receiving, by the device, power limit data relating to at least a first power limit of the first locomotive and a second power limit of the second locomotive;

proportioning, by the device, the power demand into at least a first power allocation for the first locomotive and a second power allocation for the second locomotive, the first power allocation and the second power allocation being configured to collectively approximate at least a portion of the power demand;
adjusting, by the device and based on the power demand and the first power limit, the first power allocation;
adjusting, by the device and based on the power demand and the second power limit, the second power allocation;
causing, by the device, the first locomotive to be operated according to the first power allocation; and
causing, by the device, the second locomotive to be operated according to the second power allocation,
wherein adjusting the first power allocation comprises:
comparing the first power allocation with the first power limit; and decreasing the first power allocation by a deration amount based on determining that the first power allocation exceeds the first power limit the deration amount approximating an overage of the first power allocation relative to the first power limit.

2. The method of claim 1, wherein receiving the power demand data comprises:
receiving one or more of a propulsion request or a dynamic braking request from a user interface of a locomotive control unit; and
determining the power demand based on one or more of the propulsion request or the dynamic braking request.

3. The method of claim 1, wherein receiving the power limit data comprises:
receiving one or more of engine data, traction motor data, or health data associated with at least one of the first locomotive or the second locomotive.

4. The method of claim 1, wherein proportioning the power demand comprises:
determining a power limit ratio between at least the first power limit and the second power limit; and
proportioning the power demand between at least the first power allocation and the second power allocation according to the power limit ratio.

5. The method of claim 1, wherein the adjusting the first power allocation further comprises:
comparing the power demand with at least the first power allocation and the second power allocation; and
increasing the first power allocation by a compensation amount based on determining that the power demand is not satisfied,
the compensation amount approximating a shortage of at least the first power allocation and the second power allocation relative to the power demand, and
the first power allocation being limited to the first power limit.

6. The method of claim 1, further comprising:
detecting a change in at least one of the power demand, the first power limit, or the second power limit; and
adjusting, based on the change, at least one of the first power allocation or the second power allocation.

7. A device, comprising:
one or more memories; and
one or more processors, communicatively coupled to the one or more memories, configured to:
receive power demand data relating to a power demand of a consist, the consist including a plurality of locomotives;
receive power limit data relating to respective power limits of the plurality of locomotives;
proportion the power demand into respective power allocations for the plurality of locomotives,
the respective power allocations being configured to collectively approximate the power demand;
adjust, based on the power demand and the respective power limits, one or more of the respective power allocations;
cause an action to be performed in connection with the respective power allocations; and
when adjusting one or more of the respective power allocations:
compare the respective power allocations with the respective power limits; and
decrease one or more of the respective power allocations based on determining that the respective power allocations exceed the respective power limits.

8. The device of claim 7, wherein the one or more processors are configured to, when receiving the power limit data:
receive one or more of respective engine data, respective traction motor data, or respective health data associated with the plurality of locomotives.

9. The device of claim 7, wherein the one or more processors are configured to, when proportioning the power demand:
determine a power limit ratio between the respective power limits; and
proportion the power demand between the respective power allocations according to the power limit ratio.

10. The device of claim 7, wherein the one or more processors are configured to, when causing the action to be performed:
generate respective control signals for operating the plurality of locomotives according to the respective power allocations; and
transmit, to respective locomotive control units of the plurality of locomotives, the respective control signals.

11. The device of claim 7, wherein the one or more processors are further configured to:
determine a derated power demand based on the power demand and the respective power limits; and
proportion the derated power demand into respective derated power allocations for the plurality of locomotives.

12. A first locomotive of a consist, comprising:
a frame;
a traction motor coupled to the frame;
an engine operatively coupled to the traction motor; and
a control unit in communication with the traction motor and the engine, the control unit being configured to:
receive a power demand of the consist,
determine a first power limit of the first locomotive,
receive a second power limit of a second locomotive of the consist and a third power limit of a third locomotive of the consist,
proportion the power demand into a first power allocation for the first locomotive, a second power allocation for the second locomotive, and a third power allocation for the third locomotive,
adjust the first power allocation based on the power demand and the first power limit,
adjust the second power allocation based on the power demand and the second power limit,
adjust the third power allocation based on the power demand and the third power limit, cause an action to be performed in connection with the first power allocation, the second power allocation, and the third power allocation, and when determining the first power limit:
  receive power limit data from one or more sensors coupled to the traction motor and the engine,
  the one or more sensors being configured to generate the power limit data based on one or more of engine data, traction motor data, or health data, and
  determine the first power limit based on the power limit data.

13. The first locomotive of claim 12, wherein the control unit is configured to, when receiving the power demand:
  receive one or more of a propulsion request or a dynamic braking request from a user interface of the control unit, and
  determine the power demand based on one or more of the propulsion request or the dynamic braking request.

14. The first locomotive of claim 12, wherein the control unit is configured to, when proportioning the power demand:
  proportion the power demand into the first power allocation, the second power allocation, and the third power allocation such that the first power allocation, the second power allocation, and the third power allocation collectively approximate the power demand.

15. The first locomotive of claim 12, wherein the control unit is configured to, when proportioning the power demand:
  determine a power limit ratio between the first power limit, the second power limit, and the third power limit, and
  proportion the power demand between the first power allocation, the second power allocation, and the third power allocation according to the power limit ratio.

16. The first locomotive of claim 12, wherein the control unit is configured to, when adjusting the second power allocation:
  compare the second power allocation with the second power limit, and
  decrease the second power allocation by a deration amount based on determining that the second power allocation exceeds the second power limit,
    the deration amount approximating an overage of the second power allocation relative to the second power limit.

17. The first locomotive of claim 12, wherein the control unit is configured to, when causing the action to be performed:
  operate one or more of the traction motor or the engine of the first locomotive according to the first power allocation,
  generate a control signal for operating the second locomotive according to the second power allocation, and
  generate a control signal for operating the third locomotive according to the third power allocation.

* * * * *